(12) United States Patent
Nagumo et al.

(10) Patent No.: US 9,342,064 B2
(45) Date of Patent: May 17, 2016

(54) MOTION SFC PROGRAM COMPONENT CREATION DEVICE

(75) Inventors: Kensuke Nagumo, Chiyoda-ku (JP); Kenhin Kan, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 379 days.

(21) Appl. No.: 13/981,203

(22) PCT Filed: Jan. 31, 2011

(86) PCT No.: PCT/JP2011/051894
§ 371 (c)(1),
(2), (4) Date: Jul. 23, 2013

(87) PCT Pub. No.: WO2012/104959
PCT Pub. Date: Aug. 9, 2012

(65) Prior Publication Data
US 2013/0304242 A1    Nov. 14, 2013

(51) Int. Cl.
*G05B 19/042*    (2006.01)
*G05B 19/05*    (2006.01)

(52) U.S. Cl.
CPC .......... *G05B 19/0426* (2013.01); *G05B 19/056* (2013.01)

(58) Field of Classification Search
CPC .......................... G05B 19/0426; G05B 19/056
See application file for complete search history.

(56) References Cited

U.S. PATENT DOCUMENTS

| | | | | | |
|---|---|---|---|---|---|
| 5,291,389 | A | * | 3/1994 | Iwata | G05B 19/056 700/12 |
| 7,203,931 | B2 | * | 4/2007 | Minamide | G06F 8/51 700/18 |
| 8,271,105 | B2 | * | 9/2012 | Brown | B25J 9/1602 700/188 |
| 8,327,316 | B2 | * | 12/2012 | Chouinard | G05B 19/056 717/100 |
| 2006/0074527 | A1 | * | 4/2006 | Bhatt | B25J 9/1658 700/251 |
| 2009/0089674 | A1 | * | 4/2009 | Silvestro | G05B 19/05 715/711 |
| 2010/0262265 | A1 | * | 10/2010 | Karaffa | G05B 19/056 700/87 |

FOREIGN PATENT DOCUMENTS

| | | |
|---|---|---|
| JP | 07-160191 A | 6/1995 |
| JP | 08-286901 A | 11/1996 |
| JP | 09-251305 A | 9/1997 |
| JP | 10-301607 A | 11/1998 |
| JP | 10-340110 A | 12/1998 |
| JP | 2001-005504 A | 1/2001 |
| JP | 2002-268896 A | 9/2002 |

(Continued)

OTHER PUBLICATIONS

Hidehiko Matsumoto, "Engineering Environment 'MT Developer2' for Motion Controllers", Apr. 2007, pp. 265-268, vol. 81, No. 4.

(Continued)

*Primary Examiner* — Michael D Masinick
(74) *Attorney, Agent, or Firm* — Sughrue Mion, PLLC; Richard C. Turner

(57) ABSTRACT

A motion SFC program component creation device includes a componentization unit that componentizes, in a program unit, a motion SFC program including a series of a plurality of steps, and an incorporation unit that incorporates the componentized motion SFC programs into a motion SFC program used for a motion control executed by a driving command device that supplies a driving command to a drive device.

9 Claims, 12 Drawing Sheets

(56) References Cited

FOREIGN PATENT DOCUMENTS

| | | |
|---|---|---|
| JP | 3409269 A | 5/2003 |
| TW | 200910098 A | 3/2009 |

OTHER PUBLICATIONS

Taiwanese Office Action, dated Jan. 22, 2014, Application No. 100117166.

* cited by examiner

FIG.1

| No. | PATTERN | CONFIGURATION | CODE |
|---|---|---|---|
| 1 | SERIAL | MOTION CONTROL STEP [K] |  |
| | | ONE-TIME-EXECUTION-TYPE OPERATION CONTROL STEP [F] |  |
| | | SCAN-EXECUTION-TYPE OPERATION CONTROL STEP [FS] |  |
| | | SHIFT TRANSITION STEP [G] |  |
| | | WAIT TRANSITION STEP [[G]] |  |
| | | WAIT ON TRANSITION STEP [ON] |  |
| | | WAIT OFF TRANSITION STEP [OFF] |  |
| 2 | SELECTIVE BRANCHING | BRANCH DESTINATIONS ARE ALL SHIFT TRANSITION STEPS | 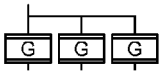 |
| | | BRANCH DESTINATIONS ARE ALL WAIT TRANSITION STEPS | 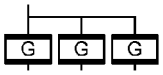 |
| 3 | SELECTIVE COMBINATION | COMBINATION BY SELECTIVE BRANCHING OF SHIFT TRANSITION STEPS | 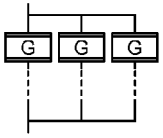 |
| | | COMBINATION BY SELECTIVE BRANCHING OF WAIT TRANSITION STEPS | 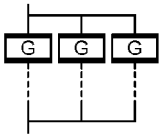 |
| | | COMBINATION BY SHIFT Y/N TRANSITION STEPS | 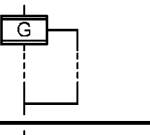 |
| | | COMBINATION BY WAIT Y/N TRANSITION STEPS | 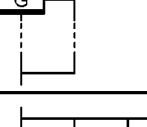 |
| 4 | PARALLEL BRANCHING | BRANCH DESTINATIONS ARE ALL NON-SHIFT TRANSITION/ALL NON-WAIT TRANSITION STEPS | 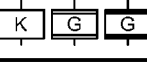 |
| 5 | PARALLEL COMBINATION | COMBINATION BY PARALLEL BRANCHING | 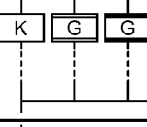 |
| 6 | Y/N TRANSITION | SHIFT Y/N TRANSITION STEP [G-] | 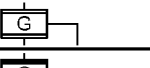 |
| | | WAIT Y/N TRANSITION STEP [[G-]] | 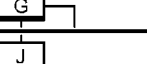 |
| 7 | JUMP | JUMP STEP [J] |  |

FIG.5-1

| No. | COMBINATION PATTERN | CASE OF COMPONENTIZATION BLOCK | EXAMPLE BY BASIC STEPS |
|---|---|---|---|
| 1 | Input: SERIAL<br>Output: SERIAL |  | 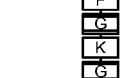 |
| 2 | Input: SERIAL<br>Output: SELECTIVE COMBINATION |  | 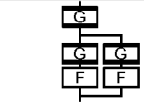 |
| 3 | Input: SERIAL<br>Output: PARALLEL COMBINATION | 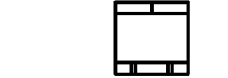 | 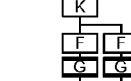 |
| 4 | Input: SERIAL<br>Output: JUMP |  |  |
| 5 | Input: SELECTIVE BRANCHING<br>Output: SERIAL |  | 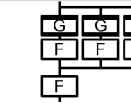 |
| 6 | Input: SELECTIVE BRANCHING<br>Output: SELECTIVE COMBINATION |  | 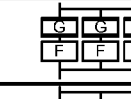 |
| 7 | Input: SELECTIVE BRANCHING<br>Output: PARALLEL COMBINATION |  | 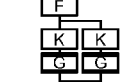 |
| 8 | Input: SELECTIVE BRANCHING<br>Output: JUMP |  | 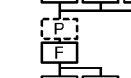 |
| 9 | Input: PARALLEL BRANCHING<br>Output: SERIAL |  | 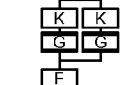 |
| 10 | Input: PARALLEL BRANCHING<br>Output: SELECTIVE COMBINATION | 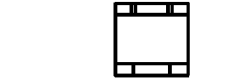 | 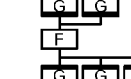 |
| 11 | Input: PARALLEL BRANCHING<br>Output: PARALLEL COMBINATION |  | 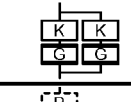 |
| 12 | Input: PARALLEL BRANCHING<br>Output: JUMP | 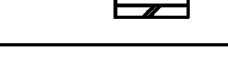 | 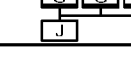 |

FIG.5-2
| No. | COMBINATION PATTERN | CASE OF COMPONENTIZATION BLOCK | EXAMPLE BY BASIC STEPS |
|---|---|---|---|
| 13 | Input: Y/N TRANSITION<br>Output: SERIAL |  |  |
| 14 | Input: Y/N TRANSITION<br>Output: SELECTIVE COMBINATION |  |  |
| 15 | Input: Y/N TRANSITION<br>Output: PARALLEL COMBINATION |  | 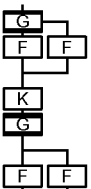 |
| 16 | Input: Y/N TRANSITION<br>Output: JUMP |  | 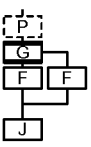 |

FIG.10-1

| TIMING | PROGRAM-COMPONENT INCORPORATION DESTINATION APPLICATION | PROGRAM COMPONENT INFORMATION |
|---|---|---|
| AT TIMING OF COMPONENT ARRANGEMENT (110) | -SFC-COMPONENT MANAGEMENT DATA-<br><br>SFC COMPONENT NUMBER<br>COMMENTS<br>F/FS/G/K USAGE NUMBERS<br>COMPONENT IDENTIFICATION ID<br>SFC-COMPONENT SETTING DATA (COMPONENT-SPECIFIC SETTING PARAMETERS) | ITEMS AND INITIAL VALUES OF BASIC DATA ON SFC COMPONENTS<br><br>COMPONENTIZATION BASIC DATA<br><SFC0><br></SFC0> |
| AT TIMING OF PROGRAM NUMBER SETTING (111) | -SFC-COMPONENT MANAGEMENT DATA-<br><br>SFC COMPONENT NUMBER<br>COMMENTS<br>F/FS/G/K USAGE NUMBERS<br>COMPONENT IDENTIFICATION ID<br>SFC-COMPONENT SETTING DATA (COMPONENT-SPECIFIC SETTING PARAMETERS) | ACQUIRE SFC COMPONENT NUMBER C AND COMMENT INFORMATION BY USER'S MANIPULATION IN FIG. 6 |
| AT TIMING OF SFC COMPONENT SETTING (COMPONENT-IZATION DATA ACQUISITION) (112) | -SFC-COMPONENT MANAGEMENT DATA-<br><br>SFC COMPONENT NUMBER<br>COMMENTS<br>F/FS/G/K USAGE NUMBERS<br>COMPONENT IDENTIFICATION ID<br>SFC-COMPONENT SETTING DATA (COMPONENT-SPECIFIC SETTING PARAMETERS) | //COMPONENT ID=XXXXXXX<br><SFC0><br>CALL K0<br>SFT G0<br></SFC0> ...<br><br>⇓<br><br>ACQUIRE INFORMATION ON USER'S CREATED MOTION SFC PROGRAM OR INFORMATION ON EXISTING PROGRAM COMPONENTS<br>CALL K0<br>SFT G0<br>... |

MOTION SFC PROGRAM COMPONENT CREATION DEVICE

CROSS REFERENCE TO RELATED APPLICATIONS

This application is a National Stage of International Application No. PCT/JP2011/051894 filed Jan. 31, 2011, the contents of all of which are incorporated herein by reference in their entirety.

FIELD

The present invention relates to a motion SFC program component creation device.

BACKGROUND

Conventionally, a motion CPU (a driving command device) that controls a servomotor (a drive device) via a servo amplifier attached to the drive unit of a production apparatus or a facility apparatus generates driving commands using a motion SFC (Sequential Function Chart) program. A user creates the motion SFC program by combining SFC codes such as an operation control step F, a WAIT transition step G, and a servo program step K. Furthermore, in the motion SFC program, numbers of axes of the servomotor to which the driving commands are issued are arbitrarily set according to the user's used device (a production apparatus or a facility apparatus). A control signal (a device) for each axis is also arbitrarily set according to the user's used device.

Patent Literature 1 describes a program creation device configured as follows. In the program creation device creating a ladder program while displaying respective components that constitute the ladder program on a display, when an unfinished program part is designated by a cursor or the like, a group of components that are highly likely input to the position of the cursor are displayed in order of priority. According to Patent Literature 1, it is supposed that this technique enables even an inexperienced program creator to efficiently search components and select an appropriate component according to the cursor position.

CITATION LIST

Patent Literature

Patent Literature 1: Japanese Patent No. 3409269

SUMMARY

Technical Problem

According to the conventional technique, it is necessary to create an SFC program by combining steps one by one, and when it comes to large-scale programming, a large amount of workload is often required. Furthermore, because of the need to perform manipulations by being combined one by one, a programming work is cumbersome and complicated. This tends to degrade the efficiency of the programming work.

In addition, when a similar program is created or an existing program is expanded, the above work is repeated from the beginning. Therefore, programs created by the conventional technique are poor in reusability and expandability.

Furthermore, differently from a simple SFC program, a work for allocating each axis to each program step to which axis one driving command is issued occurs for the motion SFC program at the time of creating the program step. At this time, a device corresponding to the axial device is in a state where it is difficult for a user to recognize the axial device and to recognize the relation of the device with the program. In addition, the user device that sets parameters is difficult to recognize in programming because the user device is given only by numerical information. Accordingly, the efficiency of the programming work performed by an inexperienced user tends to decline.

The present invention has been achieved in view of the above problems, and an object of the present invention is to achieve a motion SFC program component creation device that is capable of improving the efficiency of a programming work.

Solution to Problem

There is provided a motion SFC program component creation device comprising: a componentization unit that componentizes, in a program unit, a motion SFC program including a series of a plurality of steps; and an incorporation unit that incorporates the componentized motion SFC programs into a motion SFC program used for a motion control executed by a driving command device that supplies a driving command to a drive device.

Advantageous Effects of Invention

According to the present invention, it is made easy to use a motion SFC program for a motion control in a program unit and it is possible to reduce man-hours of a programming work. As a result, the efficiency of the programming work can be improved.

BRIEF DESCRIPTION OF DRAWINGS

FIG. 1 depicts a list of codes for displaying steps of a motion SFC according to an embodiment.

FIG. 5-1 depicts a list of codes for displaying componentized motion SFC programs according to the embodiment.

FIG. 5-2 depicts a list of codes for displaying the componentized motion SFC programs according to the embodiment.

FIG. 10-1 depicts a flow of the incorporation process in the embodiment.

FIG. 10-2 depicts a flow of the incorporation process in the embodiment.

DESCRIPTION OF EMBODIMENTS

Exemplary embodiments of a motion SFC program component creation device according to the present invention will be explained below in detail with reference to the accompanying drawings. The present invention is not limited to the embodiments.

Embodiment

A motion SFC is explained first with reference to FIG. 1. FIG. 1 depicts a list of codes (SFC codes) for displaying steps of the motion SFC.

The SFC is an abbreviation of Sequential Function Chart, and is a method of graphical programming using blocks. The SFC program is a program normally used in a PLC (Programmable Logic Controller).

A motion SFC program is a program specialized to be handled by a motion CPU that serves as a driving command device by adding the following functions to an SFC program. The motion CPU (driving command device) creates driving commands using the motion SFC program and supplies the driving commands to a servomotor (drive device) via a servo amplifier. The servomotor drives a production apparatus or a facility apparatus in response to the supplied driving commands.

The motion SFC program also supports commands to perform arithmetic operations such as a binary operation, a bit operation, a trigonometric function operation, a logical operation, and a comparison operation that the PLC alone is unable to process and that are necessary for a drive system, and can perform processes similar to C language processes.

Furthermore, there are devices serving as parameters to be handled by the motion CPU. Types of these devices include a device for designating a command target axis of a servomotor and a device on which a user freely sets data and that the user uses as a mediating element for an operation control executed by the motion CPU.

With the motion SFC, the user creates the motion SFC program by combining the steps described in SFC codes shown in FIG. 1. Examples of the steps described in the SFC codes include an operation control step F, a transition step G, and a motion control step K. The operation control step F is a step of performing the above operation processes. The transition step G is a step of determining whether to transition from a state of one of the devices that is a control signal for an axis to a next drive control. The motion control step K is a step of causing the motion CPU to issue driving commands to execute a positioning control, a velocity control, a synchronous control, and the like.

Figure 2:
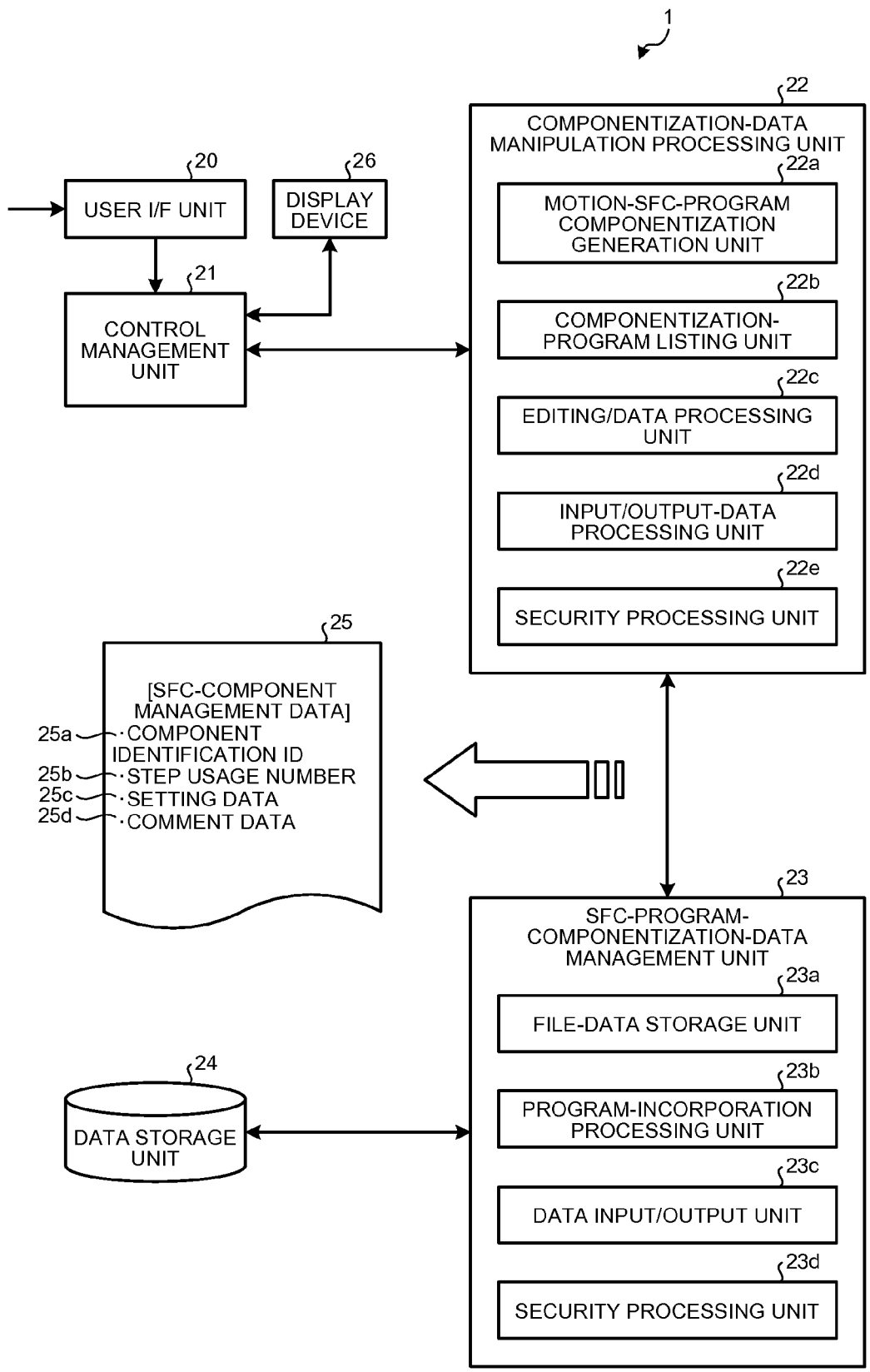
FIG. 2 depicts a configuration of a motion SFC program component creation device according to the embodiment.

A configuration of a motion SFC program component creation device 1 according to an embodiment is explained next with reference to FIG. 2. FIG. 2 is a block diagram of a configuration of the motion SFC program component creation device 1.

The motion SFC program component creation device 1 mainly includes a user I/F unit 20, a display device 26, a control management unit 21, a componentization-data manipulation processing unit (componentization unit) 22, an SFC-program-componentization-data management unit (incorporation unit) 23, and a data storage unit 24.

The user I/F unit 20 includes a mouse pointer, a keyboard, and the like, generates commands such as a command to move a pointing device on the display device 26, and a command to edit information displayed on the display device 26 in response to user's manipulation, and supplies the generated commands to the control management unit 21. The display device 26 displays predetermined information. The control management unit 21 entirely manages the respective units. For example, the control management unit 21 supplies the commands supplied from the user I/F unit 20 to the componentization-data manipulation processing unit 22. Alternatively, for example, the control management unit 21 controls the display device 26 to display the predetermined information thereon in response to a command from the componentization-data manipulation processing unit 22.

The componentization-data manipulation processing unit 22 creates the motion SFC program including a series of a plurality of steps in response to the supplied commands, and performs a componentization process for componentizing the created motion SFC program in a program unit. That is, the componentization-data manipulation processing unit 22 creates SFC-component management data 25 that is text data exchanged between the componentization-data manipulation processing unit 22 and the SFC-program-componentization-data management unit 23. The componentization-data manipulation processing unit 22 supplies the componentized motion SFC programs (the SFC-component management data 25) to the SFC-program-componentization-data management unit 23.

The SFC-program-componentization-data management unit 23 receives the componentized motion SFC programs and the SFC-component management data 25 from the componentization-data manipulation processing unit 22. The SFC-program-componentization-data management unit 23 incorporates the componentized motion SFC programs into the motion SFC program used by the motion CPU, and stores the componentized motion SFC programs in the data storage unit 24 in such a manner that the componentized motion SFC programs are actually incorporated into the motion SFC program of the motion CPU.

An internal configuration of the componentization-data manipulation processing unit 22 is explained next.

The componentization-data manipulation processing unit 22 performs the componentization process on the user's created motion SFC program according to the grammar shown in FIG. 1 via the user I/F unit 20 and the control management unit 21. Specifically, the componentization-data manipulation processing unit 22 includes a motion-SFC-program componentization generation unit 22a, a componentization-program listing unit 22b, an editing/data processing unit 22c, an input/output-data processing unit 22d, and a security processing unit 22e.

The motion-SFC-program componentization generation unit 22a creates the SFC-component management data 25 for componentizing the motion SFC program in a program unit. The SFC-component management data 25 includes a component identification ID 25a, step usage numbers 25b, setting data 25c, and comment data 25d. The componentization-program listing unit 22b reads a plurality of componentized motion SFC programs from the data storage unit 24 via the SFC-program-componentization-data management unit 23, and displays a list of the componentized motion SFC programs on the display device 26 via the control management unit 21. The editing/data processing unit 22c performs an editing process on the componentized motion SFC programs. The editing/data processing unit 22c also performs a process in relation to arrangements and parameters on the display device 26, the codes to be used, and the like for editing. The input/output-data processing unit 22d performs a process for inputting or outputting the componentized motion SFC programs (the SFC-component management data 25) to or from the SFC-program-componentization-data management unit 23.

The security processing unit 22e adds security information to the componentized motion SFC programs (the SFC-component management data 25) and changes the componentized motion SFC programs to black box programs when a command to perform a security process is received from a user.

Figure 3:
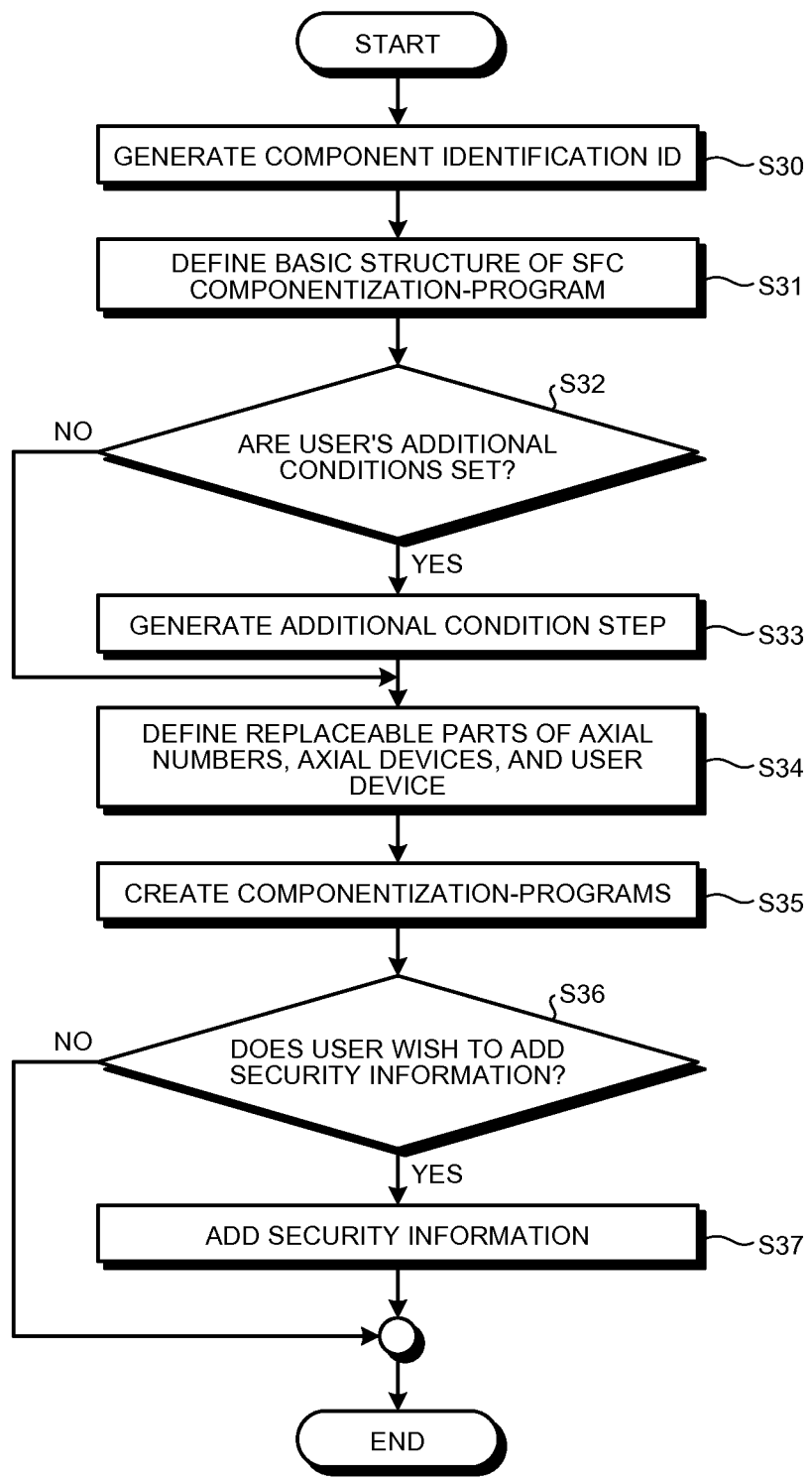
FIG. 3 is a flowchart of a flow of a componentization process in the embodiment.

A flow of the componentization process performed by the componentization-data manipulation processing unit 22 is explained with reference to FIG. 3. FIG. 3 is a flowchart of a flow of the componentization process.

The flow of a series of processes in the componentization process shown in FIG. 3 is generally explained. First, the componentization-data manipulation processing unit 22 generates a component identification ID (Step S30). The componentization-data manipulation processing unit 22 then defines a basic structure of a motion SFC program to be componentized and creates a basic configuration of the motion SFC program (Step S31). When a user adds additional conditions (YES at Step S32), the componentization-data manipulation processing unit 22 incorporates the user's additional conditions into the basic configuration created at Step S31 and establishes a configuration of the motion SFC program to be componentized (Step S33). After establishing the configuration of the motion SFC program, the componentization-data manipulation processing unit 22 analyzes parts to which axial numbers, axial devices, and a user device are set, and defines the parts as replaceable parts (Step S34). The componentization-data manipulation processing unit 22 creates the SFC-component management data 25 that defines the componentized motion SFC programs (Step S35). When the command to perform a security process is received from the user (YES at Step S36), the componentization-data manipulation processing unit 22 adds security information to the componentized motion SFC programs and changes the componentized motion SFC programs to black box programs (Step S37).

A flow of the componentization process is specifically explained below.

At Step S30, the user creates the motion SFC program via the user I/F unit 20 and the control management unit 21. The motion-SFC-program componentization generation unit 22a generates the component identification ID 25a (see FIG. 2) for the motion SFC program created by the user, and defines componentization types of the motion SFC program. The component identification ID is defined as having information by encoding large classifications and small classifications of the motion SFC program, and is assumed to be able to uniquely identify the componentization programs.

At Step S31, the motion-SFC-program componentization generation unit 22a defines the basic structure of the motion SFC program to be componentized based on the motion SFC program created within the user I/F unit 20 and that created by the control management unit 21, and generates componentization setting information. The componentization setting information includes the component identification ID 25a, the step usage numbers 25b, the setting data 25c, and the comment data 25d. That is, the motion-SFC-program componentization generation unit 22a creates the basic configuration of the motion SFC program to be componentized.

For example, the basic configuration includes motion-control step information, operation-control step information, transition step information, program selective branching information, program selective combination information, parallel branching information, parallel combination information, and information on Y/N transitions and a jump step on the motion SFC program defined in FIG. 1, which depicts the motion SFC program.

At Step S32, the motion-SFC-program componentization generation unit 22a determines whether the user's additional conditions (options) are set to the componentization setting information defined at Step S31. When the additional conditions are set (YES at Step S32), the motion-SFC-program componentization generation unit 22a advances the process to Step S33. When the additional conditions are not set (NO at Step S32), the motion-SFC-program componentization generation unit 22a advances the process to Step S34.

At Step S33, the motion-SFC-program componentization generation unit 22a incorporates the user's additional conditions into corresponding steps in the basic configuration created at Step S31, updates the componentization setting information, and establishes the configuration of the motion SFC program to be componentized. For example, the user's additional conditions are conditions so as to assign usage information on the user device to predetermined steps in the basic configuration created at Step S31. Alternatively, for example, the user's additional conditions are conditions so as to add information on control signals handled by the motion control step and detailed parameters for the driving commands such as selection of sudden acceleration or acceleration.

At Step S34, the motion-SFC-program componentization generation unit 22a performs a process so as to make variable the axial numbers, the devices, and the user device to be used among those defined for the structure of the motion SFC program to be componentized. That is, the motion-SFC-program componentization generation unit 22a refers to the componentization setting information and creates replacement setting information that specifies at least one of the axial numbers, the axial devices, and the user device in the configuration of the motion SFC program as the replaceable part. The motion-SFC-program componentization generation unit 22a updates the componentization setting information so as to include the replacement setting information.

When the componentized motion SFC program is re-edited, the replacement setting information is updated at this Step S34.

At Step S35, the motion-SFC-program componentization generation unit 22a creates the SFC-component management data 25 specified with respect to the configuration of the motion SFC program to be componentized as the componentized motion SFC programs based on the componentization setting information. The SFC-component management data 25 includes the component identification ID 25a, the step usage numbers 25b, the setting data 25c, and the comment data 25d.

At Step S36, the motion-SFC-program componentization generation unit 22a determines whether the user wishes to add the security information to the motion SFC program to be componentized. When the command to perform the security process is received from the user, the motion-SFC-program componentization generation unit 22a determines that the user wishes to add the security information (YES at Step S36) and advances the process to Step S37. When the command to perform the security process is not received from the user within a predetermined time (NO at Step S36), the motion-SFC-program componentization generation unit 22a determines that the user does not wish to add the security information (NO at Step S36) and ends the process.

At Step S37, the motion-SFC-program componentization generation unit 22a adds the security information to the componentized motion SFC programs (the SFC-component management data 25) and changes the componentized motion SFC programs to black box programs. That is, the motion-SFC-program componentization generation unit 22a performs a process for assigning password information to the SFC-component management data 25. Accordingly, unless inputting a set password, the editing/data processing unit 22c is unable to edit the componentized motion SFC programs.

Figure 4:
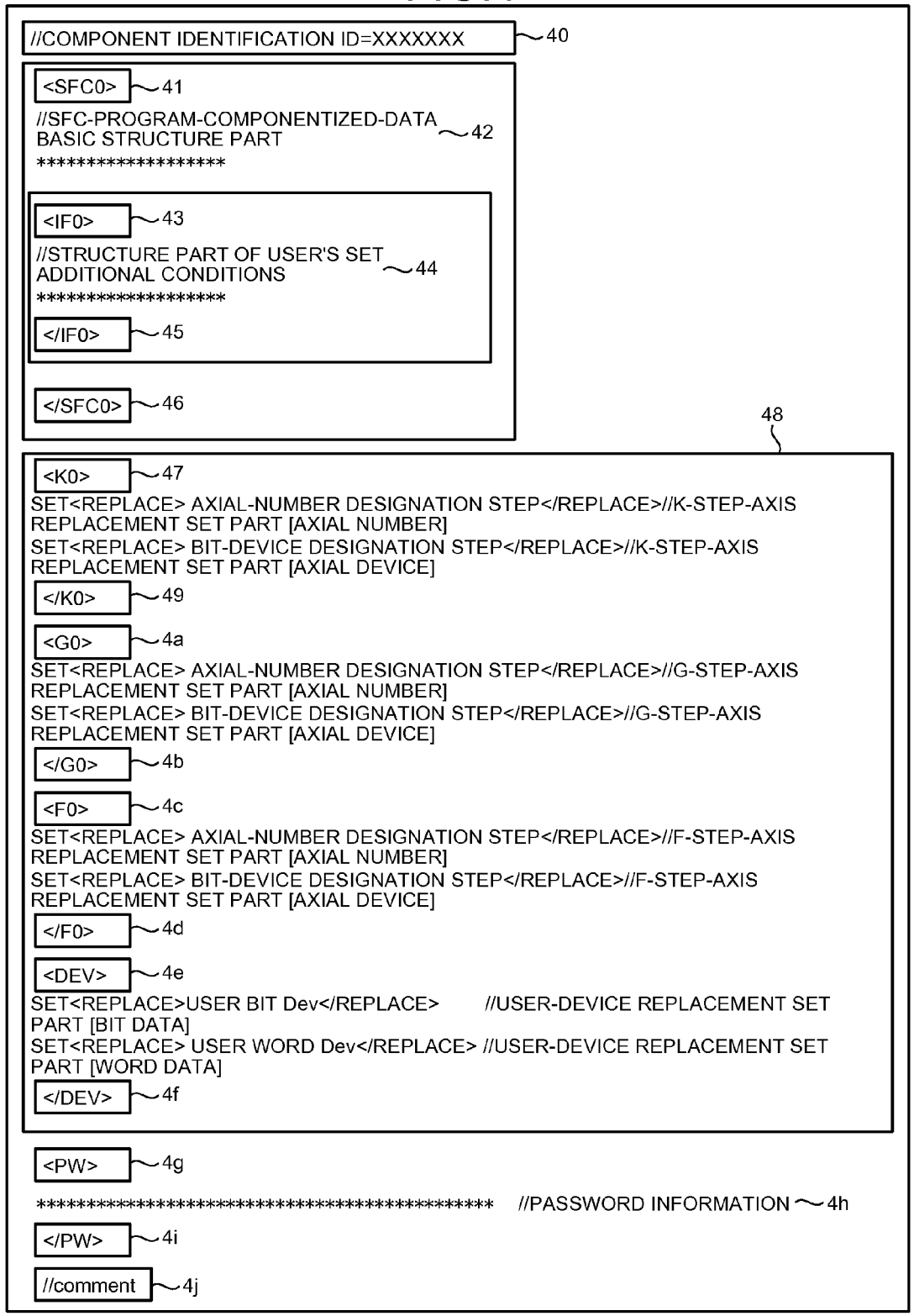
FIG. 4 depicts a data structure of SFC-component management data in the embodiment.

Next, the componentized motion SFC programs, that is, the SFC-component management data 25 is explained with reference to FIGS. 2 and 4. FIG. 4 depicts a specific data structure of the SFC-component management data 25.

As shown in FIG. 2, the SFC-component management data 25 includes the component identification ID 25a, the step usage numbers 25b, the setting data 25c, and the comment data 25d. The component identification ID 25a is an identifier having information such as large classification codes and small classification codes of the components (componentized motion SFC programs) and making it possible to uniquely identify the components. The step usage numbers 25b are usage numbers assigned to the respective steps in the motion SFC program so as to componentize the motion SFC program. The setting data 25c is setting parameters inherently held by the componentized motion SFC programs. The comment data 25d is data for setting memo information on program contents (memos indicating meanings and the like of the codes).

Specifically, an overall data structure of the SFC-component management data 25 is text data described in a text format as shown in FIG. 4. In the SFC-component management data 25, every element constituting the componentized motion SFC programs is configured by a <text name> tag to a </text name> tag. That is, the SFC-component management data 25 is the text data described in a tag format in each of which a code is put between a start tag and an end tag. The SFC-component management data 25 thereby has a data structure that facilitates reuse, expansion, and maintenance.

Component identification ID data 40 is handled as information processed in the component identification ID 25a. For example, the component identification ID data 40 is defined as numerical information obtained by encoding the large classifications and the small classifications of the motion SFC program. The user I/F unit 20, the control management unit 21, and the data storage unit 24 identify the componentization programs by acquiring this code and referring to this code.

A tag 41<SFC0> is handled as information processed in the step usage numbers 25b. The tag 41<SFC0> indicates a start tag for staring acquiring a data basic structure of the motion SFC program to be componentized. The tag 41<SFC0> is defined as information acquired when the motion-SFC-program componentization generation unit 22a starts generating the componentization setting information on the motion SFC program at Step S31 in FIG. 3, and assumed as start information on a generation process at Step S31.

Basic-structure part data 42 is handled as information for defining the basic structure of the motion SFC program to be componentized. The basic structure part data 42 is handled as the information processed for the step usage numbers 25b by acquiring a motion SFC structure and the step usage numbers defined in FIG. 1 from the motion SFC program created by a user via the user I/F unit 20 and the control management unit 21 or the motion SFC program called from the data storage unit 24.

A tag 43<IF0> is handled as information processed for the setting data 25c. The tag 43<IF0> indicates a start tag for starting acquiring user's created additional information. The tag 43<IF0> is defined as information acquired when the motion-SFC-program componentization generation unit 22a starts generating the additional information on the program componentization, and assumed as start information on a generation process at Step S33.

Additional-conditions structure part data 44 is handled as information for defining a data structure of the additional conditions set by a user for the motion SFC program to be componentized. The additional-conditions structure part data 44 is handled as the information processed for the setting data 25c by acquiring the motion SFC structure and the step usage numbers defined in FIG. 1 from the motion SFC program created by the user via the user I/F unit 20 and the control management unit 21 or the motion SFC program called from the data storage unit 24.

A tag 45</IF0> is handled as information processed for the setting data 25c. The tag 45</IF0> indicates an end tag for completing acquiring the user's created additional information. The tag 45</IF0> is defined as information acquired when the motion-SFC-program componentization generation unit 22a completes generating the additional information, and assumed as completion information on the generation process at Step S33 in FIG. 3.

A tag 46</SFC0> indicates an end tag for completing acquiring the information for defining the data basic structure of the motion SFC program to be componentized. The tag 46<SFC0> is handled as information on which the process is completed in the step usage numbers 25b by acquiring the motion SFC structure and the step usage numbers defined in FIG. 1 from the motion SFC program created by the user via the user I/F unit 20 and the control management unit 21 or the motion SFC program called from the data storage unit 24.

Replacement settable part data 48 is handled as information for defining the axial numbers, the axial devices, and the user device that can be set as replacement parts in the componentized motion SFC programs.

In the replacement settable part data 48, a start tag SET <REPLACE> is defined so as to start acquiring information on the replacement settable parts, and handled as information on starting acquiring the axial numbers, the axial devices, and the user device that can be set as the replacement parts. After acquiring the start tag SET <REPLACE>, acquisition target information on the axial numbers, the axial devices, and the user device that can be set as the replacement parts is handled as text data. This information is handled as information on targets processed by the motion-SFC-program componentization generation unit 22a at Step S34 in FIG. 3. Furthermore, an end tag </REPLACE> is defined and handled as information on completing acquiring the axial numbers, the axial devices, and the user device that can be set as the replacing parts.

Specifically, a tag 47<K0> is handled as information processed for the setting data 25c. The tag 47 <K0> indicates a start tag for starting acquiring the information on the axial numbers and the axial devices that can be set as the replacement parts at the user's created motion control step K. The tag 47<K0> is defined as information acquired when the motion-SFC-program componentization generation unit 22a starts generating replacement setting information on the axial numbers and the axial devices, and assumed as start information on a generation process at Step S34 in FIG. 3.

A tag 49</K0> is handled as information processed for the setting data 25c. The tag 49</K0> indicates an end tag for completing acquiring the information on the axial numbers and the axial devices that can be set as the replacement parts at the user's created motion control step K. The tag 49</K0> is defined as information acquired when the motion-SFC-program componentization generation unit 22a completes generating the replacement setting information on the axial numbers and the axial devices, and assumed as completion information on the generation process at Step S34 in FIG. 3.

A tag 4a <G0> is handled as information processed for the setting data 25c. The tag 4a <G0> indicates a start tag for starting acquiring information on the axial numbers and the axial devices that can be set as the replacement parts at the user's created transition step G. The tag 4a <G0> is defined as information acquired when the motion-SFC-program componentization generation unit 22a starts generating the replacement setting information on the axial numbers and the axial devices, and assumed as start information on the generation process at Step S34 in FIG. 3.

A tag 4b <G0> is handled as information processed for the setting data 25c. The tag 4b <G0> indicates an end tag for completing acquiring the information on the axial numbers and the axial devices that can be set as the replacement parts at the user's created transition step G. The tag 4b <G0> is defined as information acquired when the motion-SFC-program componentization generation unit 22a completes generating the replacement setting information on the axial numbers and the axial devices, and assumed as completion information on the generation process at Step S34 in FIG. 3.

A tag 4c <F0> is handled as information processed for the setting data 25c. The tag 4c <F0> indicates a start tag for starting acquiring the information on the axial numbers and the axial devices that can be set as the replacement parts at the user's created operation control step F. The tag 4c <F0> is defined as information acquired when the motion-SFC-program componentization generation unit 22a starts generating the replacement setting information on the axial numbers and the axial devices, and assumed as start information on the generation process at Step S34 in FIG. 3.

A tag 4d </F0> is handled as information processed for the setting data 25c. The tag 4d </F0> indicates an end tag for completing acquiring the information on the axial numbers and the axial devices that can be set as the replacement parts at the user's created operation control step F. The tag 4d </F0> is defined as the information acquired when the motion-SFC-program componentization generation unit 22a completes generating the replacement setting information on the axial numbers and the axial devices, and assumed as completion information on the generation process at Step S34 in FIG. 3.

A tag 4e <DEV> is handled as information processed for the setting data 25c. The tag 4e <DEV> indicates a start tag for starting acquiring information on the axial numbers and the axial devices that can be set as the replacement parts in the user's created user device. The tag 4e <DEV> is defined as information acquired when the motion-SFC-program componentization generation unit 22a starts generating the replacement setting information on the user device, and assumed as start information on the generation process at Step S34 in FIG. 3.

A tag 4f </DEV> is handled as information processed for the setting data 25c. The tag 4f </DEV> indicates an end tag for completing acquiring information the information on the axial numbers and the axial devices that can be set as the replacement parts in the user's created user device. The tag 4f </DEV> is defined as the information acquired when the motion-SFC-program componentization generation unit 22a completes generating the replacement setting information on the user device, and assumed as completion information on the generation process at Step S34 in FIG. 3.

A tag 4g <PW> is handled as information processed in the setting data 25c. The tag 4g <PW> indicates a start tag for starting acquiring password setting information when a user wishes to protect the componentized motion SFC programs. The tag 4g <PW> is defined as information acquired when the motion-SFC-program componentization generation unit 22a starts generating the security information, and assumed as start information on a generation process at Step S37 in FIG. 3.

Security setting data 4h is user's password-based security information and handled as information defined by the text data acquired by the user I/F unit 20. The security setting data 4h is also used as collation information at the time of cancelling the password-based security.

A tag 4i </PW> is handled as information processed for the setting data 25c. The tag 4i </PW> indicates an end tag for completing acquiring the password setting information when a user wishes to protect the componentized motion SFC programs. The tag 4i </PW> is defined as information acquired when the motion-SFC-program componentization generation unit 22a completes generating the security information, and assumed as completion information on the generation process at Step S37 in FIG. 3.

Comment data 4j <//comment> is handled as information processed for the comment data 35d. The comment data 4j <//comment> is a tag indicating comments for causing the user to refer to the componentized motion SFC programs, and acquired by the user I/F unit 20 and the editing/data processing unit 22c.

Contents displayed on the display device 26 by the componentization-program listing unit 22b are explained next with reference to FIGS. 5-1 and 5-2. FIGS. 5-1 and 5-2 depict a list of codes for displaying componentized motion SFC programs (componentization blocks).

The componentization-program listing unit 22b reads the componentized motion SFC programs (the SFC-component management data 25) from the data storage unit 24 via the SFC-program-componentization-data management unit 23, and displays the list of the componentized motion SFC programs (the SFC-component management data 25) on the display device 26 via the control management unit 21.

For example, the componentization-program listing unit 22b displays the list of the componentized motion SFC programs in a list display screen (not shown) on the display device 26 using icons that can distinguish the componentized motion SFC programs from one another (for example, "case of componentization blocks" icons shown in FIGS. 5-1 and 5-2).

The componentization-program listing unit 22b can display the list of the componentized motion SFC programs using a tree hierarchy either in place of displaying using the icons or as well as displaying using the icons. Alternatively, the componentization-program listing unit 22b can display the list of the componentized motion SFC programs in such a manner as to classify the componentized motion SFC programs according to categories. Alternatively, the componentization-program listing unit 22b can receive a user's designated character string via the user I/F unit 20 and the control management unit 21, and display a list of the componentized motion SFC programs relevant to the character string among those read from the data storage unit 24.

Furthermore, the componentization-program listing unit 22b displays a combination of SFC codes on the display device 26 so as to represent the contents of the componentized motion SFC programs when, for example, a user clicks on the icon. That is, the componentization-program listing unit 22b displays display objects that are the combination of a plurality of SFC codes shown in FIG. 1 (display objects in "EXAMPLE BY BASIC STEPS" shown in FIGS. 5-1 and 5-2, for example).

Screens displayed on the display device 26 by the editing/data processing unit 22c are explained next with reference to FIGS. 6 to 8.

Figure 6:
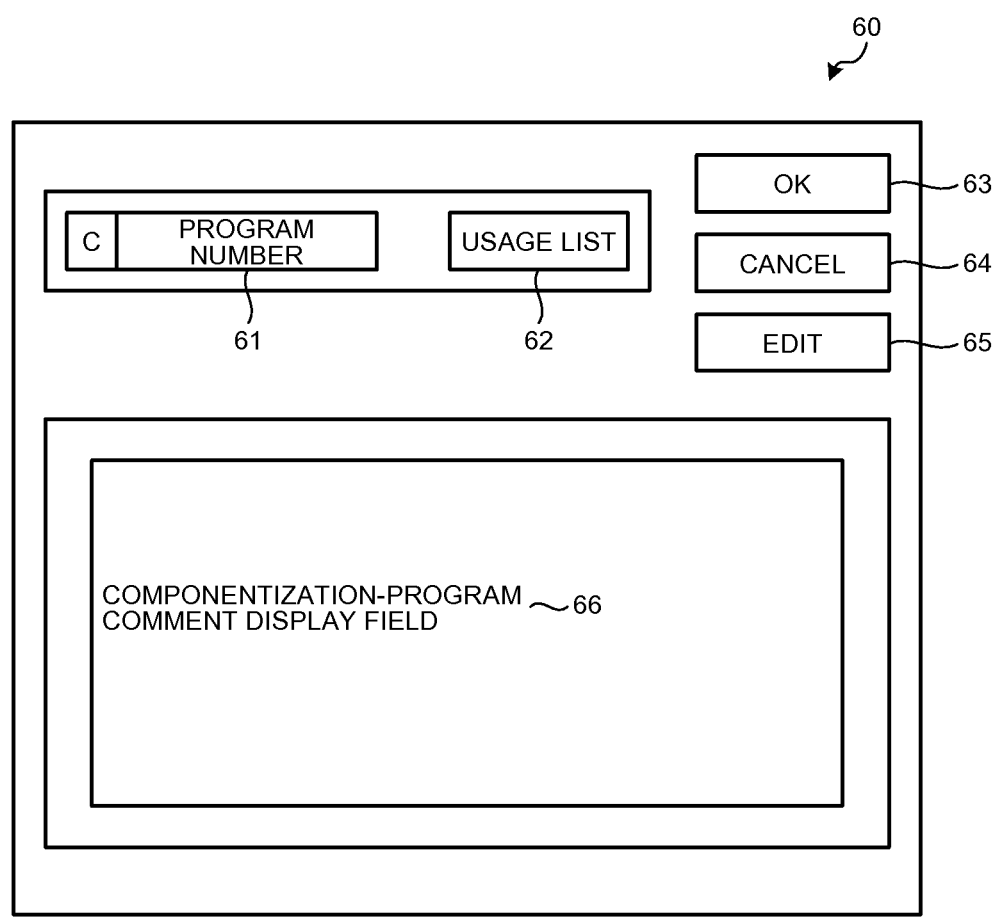
FIG. 6 depicts a screen for editing componentization programs according to the embodiment.
Figure 7:
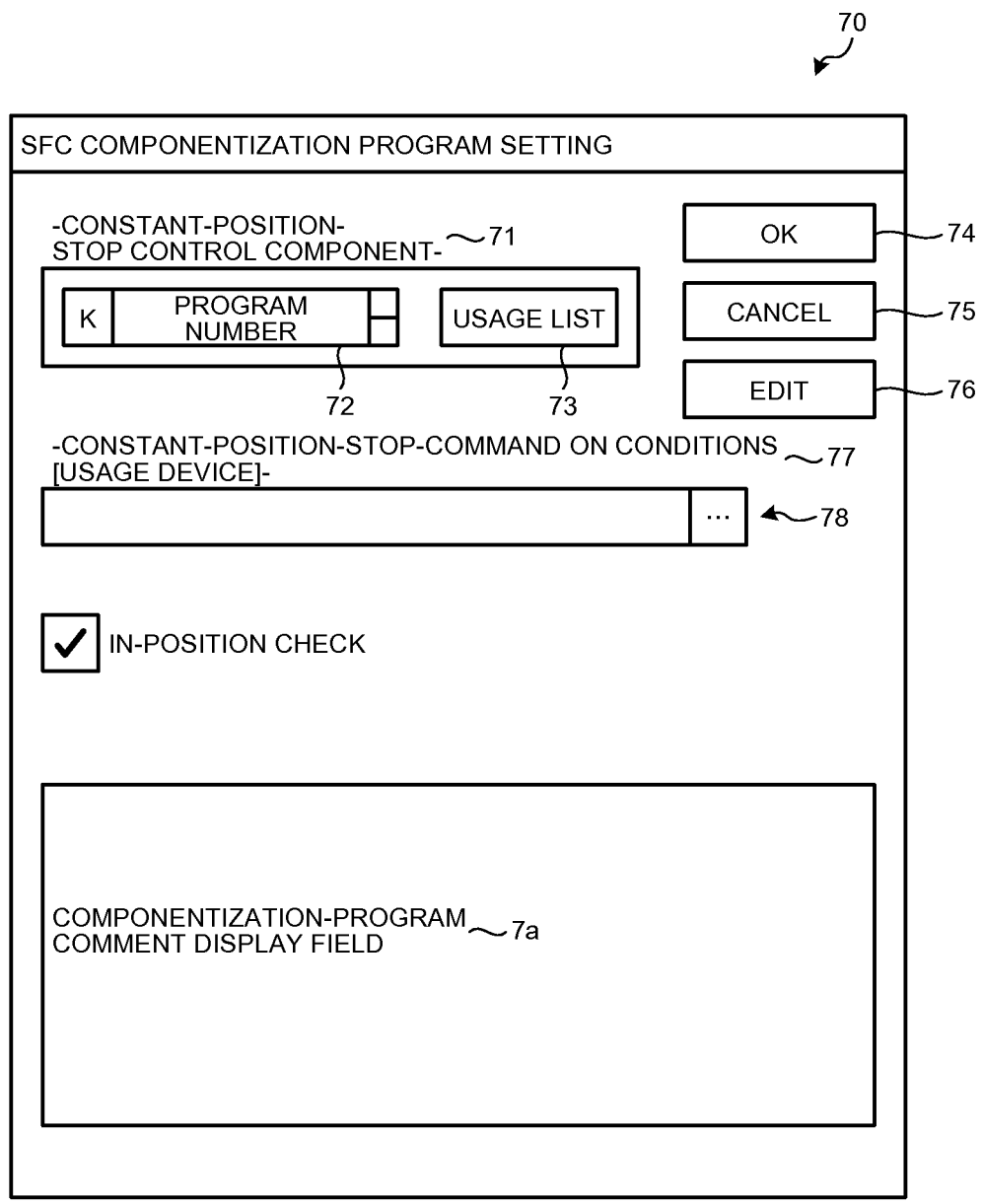
FIG. 7 depicts a screen for editing the componentization programs according to the embodiment.
Figure 8:
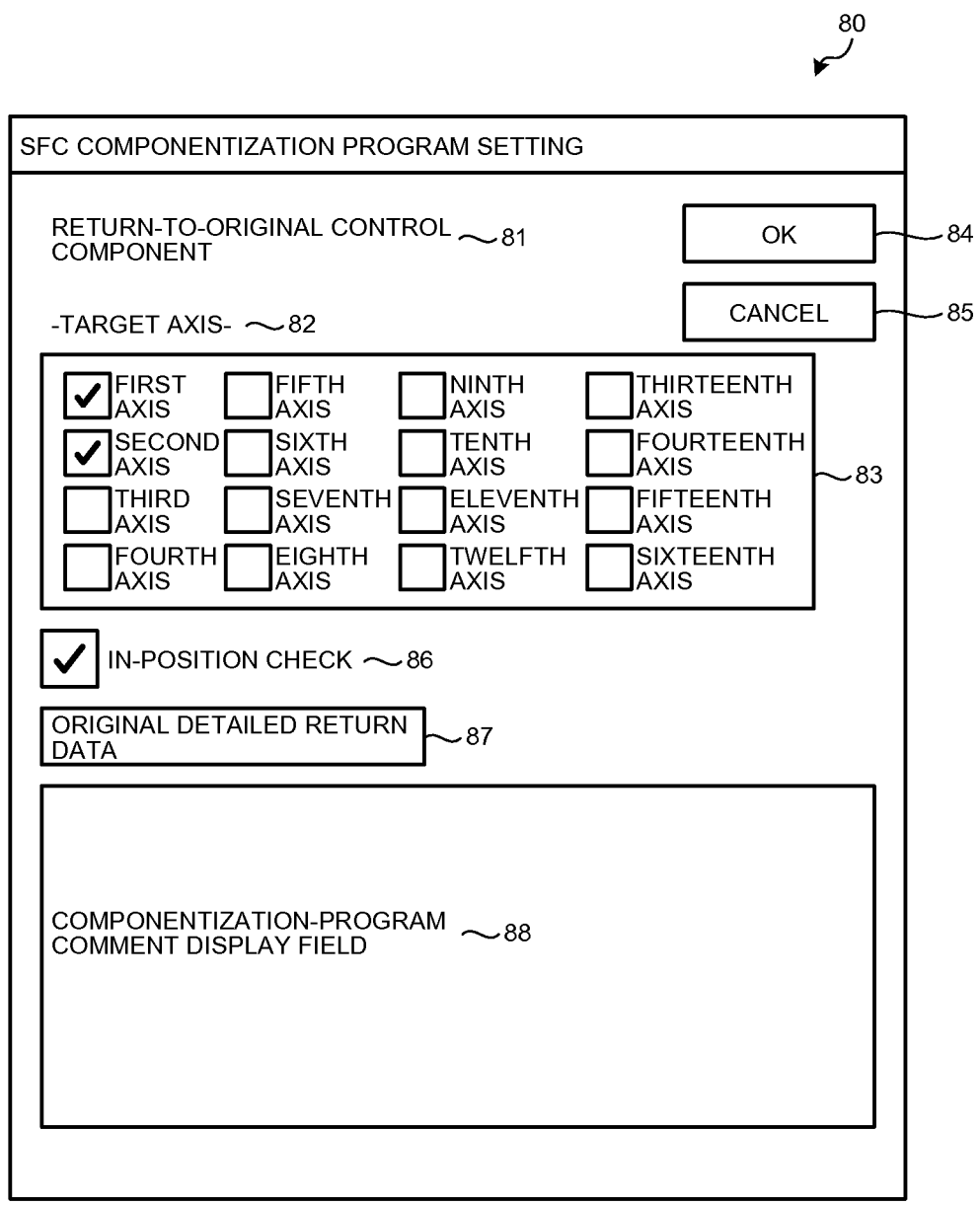
FIG. 8 depicts a screen for editing the componentization programs according to the embodiment.

So as to be handled the componentized motion SFC programs while being defined in the programs as shown in FIG. 1, the componentized motion SFC programs are defined at a motion-SFC-program componentization step C (Component), are edited using I/F screens shown in, for example, FIGS. 6 to 8, and are then subjected to an incorporation process.

FIG. 6 depicts an I/F screen 60 for editing the componentized motion SFC programs by the user I/F unit 20, the control management unit 21, and the editing/data processing unit 22c. The I/F screen 60 includes a program-number input unit 61, a usage list button 62, an OK button 63, a cancel button 64, an edit button 65, and a comment input unit 66.

For example, a program number serving as the component identification ID of the componentized motion SFC programs is input to the program-number input unit 61. The usage list button 62 is a button that enables the set componentized motion SFC programs to be displayed as a list and to be selected. The OK button 63 is a button pressed for confirming editing contents at the time of completing editing. The cancel button 64 is a button pressed for cancelling the editing contents. The edit button 65 is a button pressed for making the selected motion SFC program into an editable state. The comment input unit 66 is a field in which a source code of the selected motion SFC program is displayed and which is used to enter comments on the source code.

FIG. 7 depicts an I/F screen 70 for editing the stereotyped and componentized motion SFC programs (the SFC-component management data 25) by the user I/F unit 20, the control management unit 21, and the editing/data processing unit 22c. The I/F screen 70 is called in response to a user's command via the user I/F unit 20 and used when a constant-position-stop control is to be executed. The I/F screen 70 includes a basic-configuration title part 71, a program-number input unit 72, a usage list button 73, an OK button 74, a cancel button 75, an edit button 76, a user's-additional-conditions title part 77, a user's-additional-condition input unit 78, a user's-additional-condition input unit 79, and a comment input unit 7a.

A title (a constant-position-stop control component, for example) for the basic configuration of the stereotyped and componentized motion SFC programs is displayed in the basic-configuration title part 71. For example, the program number serving as the component identification ID of the componentized motion SFC programs is input to the program-number input unit 72. The usage list button 73 is a button that enables the set componentized motion SFC programs to be displayed as a list and to be selected. The OK button 74 is a button pressed for confirming editing contents at the time of completing editing. The cancel button 75 is a button pressed for cancelling the editing contents. The edit button 76 is a button pressed for making the selected motion SFC program into an editable state. A title (constant-position-stop-command ON conditions [used device], for example) for the user's additional conditions in the stereotyped and componentized motion SFC programs is input to or displayed in the user's-additional-conditions tile part 77. Contents of the user's additional conditions (PX1 . . . , for example) are input to the user's-additional-condition input unit 78. Contents of the user's additional conditions (an in-position check, for example) are input to the user's-additional-condition input unit 79. The comment input unit 7a is a field in which the source code of the selected motion SFC program is displayed and that is used to enter comments on the source code.

Conventionally, it is necessary to incorporate the SFC codes defined in FIG. 1 for every step at the time of creating the motion SFC program. According to the present embodiment, it is easy to create a program so as to cause the motion CPU to execute a control in such a manner as to add user's wishes to the stereotyped constant-position-stop control by incorporating a user's-additional-conditions setting screen into a stereotyped constant-position-stop control setting screen as shown in, for example, FIG. 7.

FIG. 8 depicts an I/F screen 80 for editing the stereotyped and componentized motion SFC programs (the SFC-component management data 25) by the user I/F unit 20, the control management unit 21, and the editing/data processing unit 22c. The I/F screen 80 is called in response to a user's command via the user I/F unit 20 and used when a return-to-original control is to be executed. The I/F screen 80 includes a basic-configuration title part 81, a basic-configuration title part 82, a return-to-original target-axis input unit 83, an OK button 84, a cancel button 85, a user's-additional-condition input unit 86, a user's-additional-condition input unit 87, and a comment input unit 88.

A title (return-to-original control component, for example) for the basic configuration of the stereotyped and componentized motion SFC programs is displayed in the basic-configuration title part 81. A title (target axis selection, for example) for the basic configuration of the stereotyped and componentized motion SFC programs is displayed in the basic-configuration title part 82. For example, the number of the return-to-original target axis is input to the return-to-original target-axis input unit 83. The OK button 84 is a button pressed for confirming editing contents at the time of completing editing. Contents of the user's additional conditions (an in-position check, for example) are input to the user's-additional-condition input unit 86. Contents of the user's additional conditions (return-to-original detailed data, for example) are input to the user's-additional-condition input unit 87. The comment input unit 88 is a field in which the source code of the selected motion SFC program is displayed and that is used to enter comments on the source code.

Conventionally, it is necessary to incorporate the SFC codes defined in FIG. 1 for every step at the time of creating the motion SFC program. According to the present embodiment, it is easy to create a program so as to cause the motion CPU to execute a control in such a manner as to add user's wishes to the stereotyped return-to-original control by incorporating a user's-additional-conditions setting screen into a stereotyped return-to-original control setting screen as shown in, for example, FIG. 8.

The I/F screens 70 and 80 shown in FIGS. 7 and 8 are examples of the I/F screens for editing the stereotyped and componentized motion SFC programs according to the present embodiment, and are not intended to limit the stereotyped and componentized motion SFC programs handled by the user I/F unit 20 and the editing/data processing unit 22c.

An internal configuration of the SFC-program-componentization-data management unit 23 is explained next with reference to FIG. 2.

The SFC-program-componentization-data management unit 23 includes a file-data storage unit 23a, a program-incorporation processing unit 23b, a data input/output unit 23c, and a security processing unit 23d.

The file-data storage unit 23a performs a storage process on the componentized motion SFC programs (the SFC-component management data 25). The file-data storage unit 23a incorporates the componentized motion SFC programs into the motion SFC program used by the motion CPU. Furthermore, the file-data storage unit 23a passes the componentized motion SFC programs to the data input/output unit 23c in such a manner that the componentized motion SFC programs are actually incorporated into the motion SFC program of the motion CPU (in such a manner that the replaceable parts are replaced to be fit to an incorporation destination). The data input/output unit 23c performs a process for writing the componentized motion SFC programs into the data storage unit 24. That is, the data input/output unit 23c stores the componentized motion SFC programs in the data storage unit 24 in such a manner that the componentized motion SFC programs are actually incorporated into the motion SFC program of the motion CPU. Furthermore, the data input/output unit 23c reads the componentized motion SFC programs from the data storage unit 24 in response to the command from the componentization-data manipulation processing unit 22, and supplies the componentized motion SFC programs to the componentization-data manipulation processing unit 22. The security processing unit 23d performs a security process on the componentized motion SFC programs.

Figure 9:
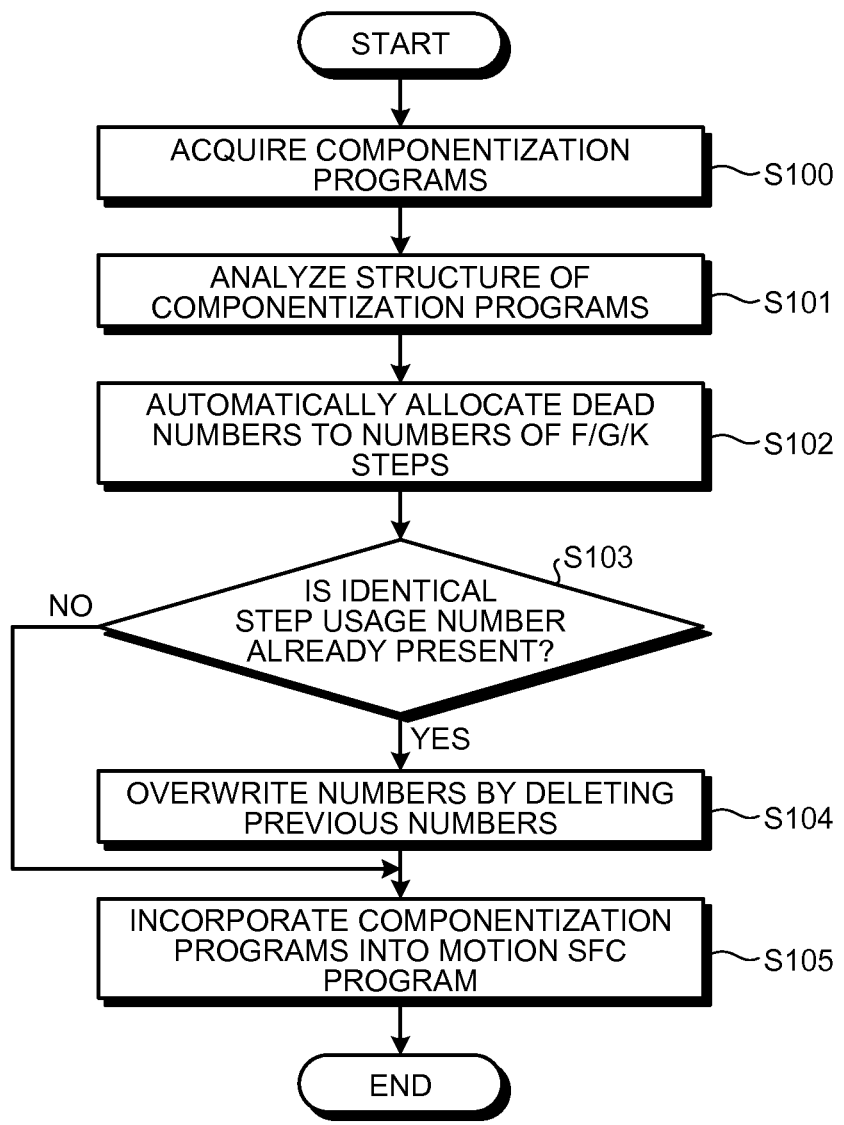
FIG. 9 is a flowchart of a flow of an incorporation process in the embodiment.

A flow of the incorporation process performed by the SFC-program-componentization-data management unit 23 is explained next with reference to FIG. 9. FIG. 9 is a flowchart of a flow of an incorporation process.

The flow of a series of processes in the incorporation process shown in FIG. 9 is generally explained. First, the SFC-program-componentization-data management unit 23 acquires the componentized motion SFC programs (the SFC-component management data 25) (Step S100), and analyzes the structure of the componentized motion SFC programs (Step S101). The SFC-program-componentization-data management unit 23 automatically allocates dead numbers to F/G/K steps in the motion SFC program used by the motion CPU (Step S102). After this process, the SFC-program-componentization-data management unit 23 determines whether the step usage numbers in the componentized motion SFC programs overlap those in the motion SFC program used by the motion CPU (Step S103). When an overlapping number is present (YES at Step S103), the SFC-program-componentization-data management unit 23 deletes the previous step usage numbers in the program used by the motion CPU and overwrites new other step usage numbers on the previous step usage numbers (Step S104). The SFC-program-componentization-data management unit 23 incorporates the componentized motion SFC programs into the motion SFC program used by the motion CPU (Step S105).

A flow of the incorporation process is specifically explained below.

At Step S100, the program-incorporation processing unit 23b acquires the componentized motion SFC programs (the SFC-component management data 25) from the componentization-data manipulation processing unit 22.

At Step S101, the program-incorporation processing unit 23b analyzes the structure of the componentized motion SFC programs using the SFC-component management data 25. That is, the program-incorporation processing unit 23b acquires the usage numbers of the F, K, and G steps in the componentized motion SFC programs by referring to the step usage numbers 25b of the SFC-component management data 25.

At Step S102, the program-incorporation processing unit 23b identifies dead numbers based on the usage numbers acquired at Step S101. The program-incorporation processing unit 23b automatically adopts and allocates the dead numbers to the F, G, and K steps in the incorporation destination, that is, the motion SFC program used by the motion CPU.

At Step S103, the program-incorporation processing unit 23b determines whether the usage numbers of the F, K, and G steps in the componentized motion SFC program overlap those in the motion SFC program used by the motion CPU. When the overlapping number is present (YES at Step S103), the program-incorporation processing unit 23b advances the process to Step S104. When there is no overlapping number (NO at Step S103), the program-incorporation processing unit 23b advances the process to Step S105.

At Step S104, the program-incorporation processing unit 23b deletes the usage numbers automatically allocated to the F, G, and K steps in the motion SFC program used by the motion CPU. The program-incorporation processing unit 23b updates the usage numbers of the F, G, and K steps in the motion SFC program used by the motion CPU by overwriting other usage numbers that do not overlap those of the F, K, and G steps in the componentized motion SFC programs on the previous usage numbers.

At Step S105, the program-incorporation processing unit 23b replaces the replaceable parts in the componentized motion SFC programs (the SFC-component management data 25) by parts according to characteristics of the motion-CPU command target (that is, a servomotor). The program-incorporation processing unit 23b incorporates the motion SFC programs in which the replaceable parts are replaced into the motion SFC program used by the motion CPU.

The componentized motion SFC programs can be thereby actually used by the motion CPU.

Exchange between the motion SFC program (a program-component incorporation destination application) used by the motion CPU and the componentized motion SFC programs (program component information) in the incorporation process is explained next with reference to FIGS. 10-1 and 10-2.

Figures 2, 10:
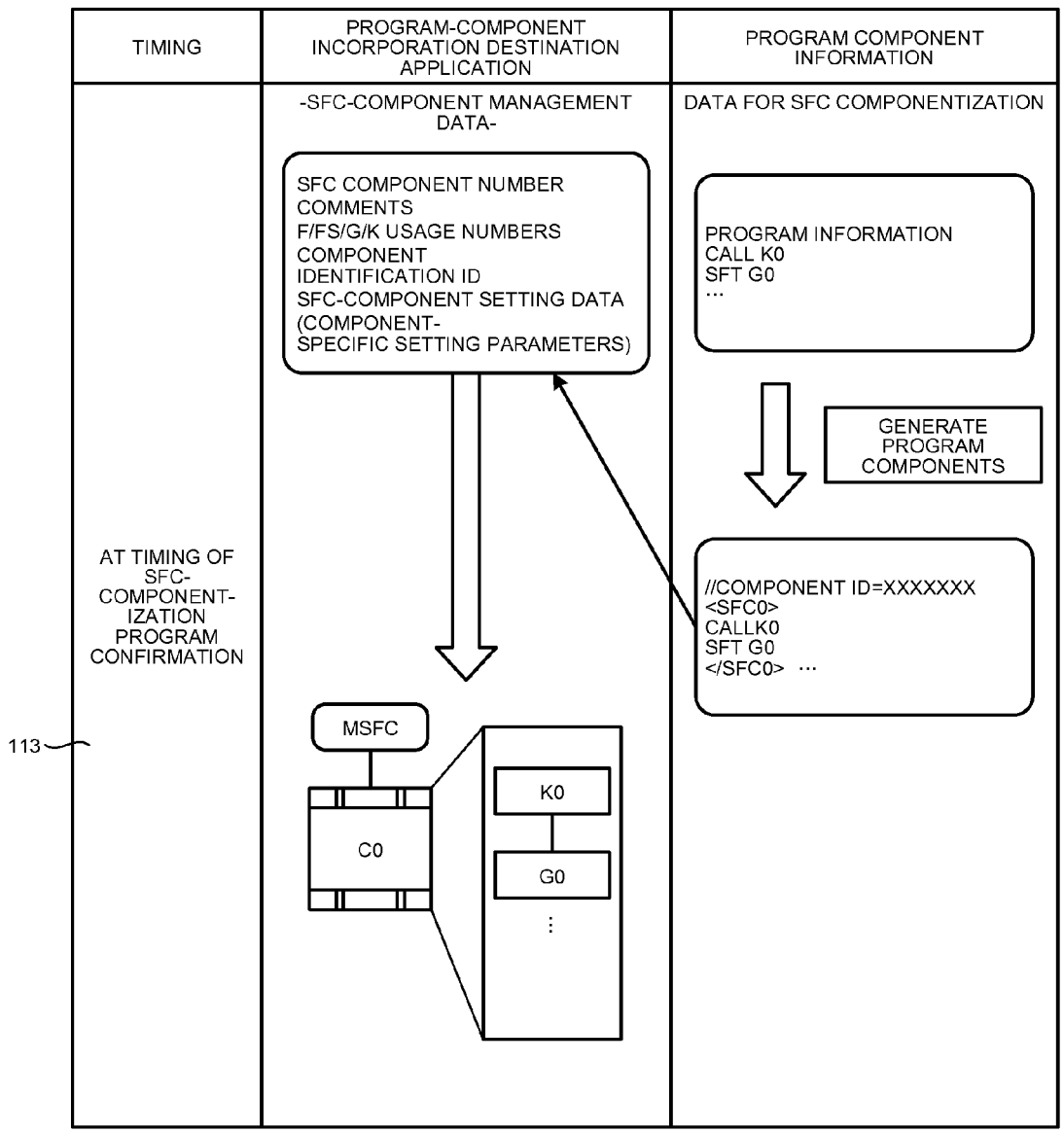

At a timing of a component arrangement 110 shown in FIG. 10-1, the program-incorporation processing unit 23b acquires the componentized motion SFC programs (the SFC-component management data 25) from the componentization-data manipulation processing unit 22. The program-incorporation processing unit 23b sets SFC-component setting data in the motion SFC program used by the motion CPU based on componentization basic data in the componentized motion SFC programs (that is, the part from <SFC0> to </SFC0> in the SFC-component management data 25). That is, the program-incorporation processing unit 23b creates a basic structure for incorporating the componentized motion SFC programs into the SFC-component management data of the motion SFC program (the incorporation destination) used by the motion CPU, and establishes a base for the exchange with the componentized motion SFC programs.

At a timing of a program number setting 111, the program-incorporation processing unit 23b acquires SFC component numbers and comment information from the componentized motion SFC programs (the SFC-component management data 25). For example, the SFC component numbers and the comment information are acquired as program numbers and comments by user's manipulation via the I/F screen 60 shown in FIG. 6, respectively. The program-incorporation processing unit 23b sets the acquired SFC component numbers and comment information into the SFC-component management data of the motion SFC program (the incorporation destination) used by the motion CPU.

A process at the timing of the component arrangement 110 and that at the timing of the program number setting 111 correspond to a process at Step S100 shown in FIG. 9.

At a timing of an SFC component setting 112 shown in FIG. 10-1, the program-incorporation processing unit 23b acquires information on the configuration of the motion SFC program that forms the basis for componentization, the usage steps, the usage axial numbers, the axial devices, and the user device from the SFC-component setting data within the SFC-component management data of the motion SFC program (the incorporation destination) used by the motion CPU. Furthermore, the program-incorporation processing unit 23b acquires the information on the user's created motion SFC program and that on previously-created existing motion SFC programs from the componentized motion SFC programs (the SFC-component management data 25). The program-incorporation processing unit 23b analyzes the structure of the componentized motion SFC programs using these pieces of acquired information.

A process at the timing of the SFC component setting 112 corresponds to a process at Step S101 shown in FIG. 9.

At a timing of an SFC-componentization program confirmation 113 shown in FIG. 10-2, the program-incorporation processing unit 23b generates source codes of the componentized motion SFC programs based on a result of the above analysis. The program-incorporation processing unit 23b transmits the source codes of the componentized motion SFC programs to the SFC-component management data of the motion SFC program (the incorporation destination) used by the motion CPU, and performs processes at Steps S101 to S104 shown in FIG. 9. The program-incorporation processing unit 23b replaces the replaceable parts in the componentized motion SFC programs (the SFC-component management data 25) by parts according to the characteristics of the motion-CPU command target (i.e., a servomotor). The program-incorporation processing unit 23b incorporates the motion SFC programs that are made in such a manner that the motion SFC programs are actually incorporated into the motion SFC program of the motion CPU into the motion SFC program used by the motion CPU.

Because the componentized motion SFC programs are defined by the existing motion-SFC-program grammar shown in FIG. 1, the motion SFC program into which the componentized motion SFC programs are incorporated and that is used for the motion control is also defined by the existing motion-SFC-program grammar. In other words, the motion SFC program into which the componentized motion SFC programs are incorporated and that is used for the motion control is described in a format in which the motion SFC program can be monitored within the motion CPU. Accordingly, even after the motion SFC program into which the componentized motion SFC programs are incorporated and that is used for the motion control is transferred to the motion CPU, the componentized motion SFC programs can be used without newly adding any S/W characteristics to the motion CPU. Furthermore, it is possible to freely monitor contents of the program within the motion CPU, to debug the program contents, and to adjust the driving commands.

As described above, according to the present embodiment, the componentization-data manipulation processing unit 22 componentizes the motion SFC program including a series of a plurality of steps in a program unit, and the SFC-program-componentization-data management unit 23 incorporates the componentized motion SFC programs into the motion SFC program used for the motion control executed by the motion CPU that supplies the driving commands to the drive device. This makes it easy to use the motion SFC programs for the motion control in a program unit and to reduce man-hours of a programming work. As a result, it is possible to improve the efficiency of the programming work.

Therefore, because the time for the programming work is reduced, it is possible to expect a reduction in an operating cost of a drive device system constituted by the motion CPU, the servo amplifier, the servomotor, and auxiliary devices.

According to the present embodiment, the componentization-data manipulation processing unit 22 identifies at least one of the axial numbers, the axial devices, and the user device in the componentized motion SFC programs as the replaceable part, and the SFC-program-componentization-data management unit 23 replaces the identified replaceable part in the componentized motion SFC programs by the part according to characteristics of the motion-CPU command target (i.e., a servomotor). This makes it unnecessary to perform a work for changing the axial numbers and the devices depending on the axial numbers although the work is necessary for the conventional programming work. Therefore, it is possible to improve the reusability of the motion SFC programs. Furthermore, it is possible to improve the expandability of the motion SFC programs because the parts can be replaced on the user device side. In other words, because the axial numbers, the axial devices, and the user device of the driving command targets can be freely replaced, the above drive device system can be flexibly changed according to the characteristics and it can be expected to facilitate expanding or improving the device.

According to the present embodiment, the componentized motion SFC programs exchanged between the componentization-data manipulation processing unit 22 and the SFC-program-componentization-data management unit 23, that is, the SFC-component management data 25 is text data described in a tag format in which a code is put between the start tag and the end tag. This facilitates the reuse, the expansion, and the maintenance of the componentized motion SFC programs.

According to the present embodiment, the motion SFC program into which the componentized motion SFC programs are incorporated and that is used for the motion control is described in the format in which the motion SFC program can be monitored within the motion CPU. With this configuration, even after the motion SFC program into which the componentized motion SFC programs are incorporated is transferred to the motion CPU, the componentized motion SFC programs can be used easily reused, expanded, and maintained.

According to the present embodiment, the componentization-data manipulation processing unit 22 adds the security information to the componentized motion SFC programs and changes the componentized motion SFC programs to black box programs. It is thereby possible to realize the secrecy of information on core functions of the drive system that a user does not wish to disclose.

According to the present embodiment, the componentization-program listing unit 22b displays a list of a plurality of componentized motion SFC programs including the user's created componentized motion SFC programs on the display device 26. This enables the user to arbitrarily select the componentized motion SFC programs.

Furthermore, a space displayed on a display device can be made compact, and it is possible to improve the operability of a user I/F such as a case where the motion SFC program can be easily componentized by manipulations such as copy, paste, and the like of the program or drag-and-drop based manipulations using a pointing device.

INDUSTRIAL APPLICABILITY

As described above, the motion SFC program component creation device according to the present invention is useful for programming motion SFC programs.

REFERENCE SIGNS LIST 1 motion SFC program component creation device
20 user I/F unit
21 control management unit
22 componentization-data manipulation processing unit
22a motion-SFC-program componentization generation unit
22b componentization-program listing unit
22c editing/data processing unit
22d input/output-data processing unit
22e security processing unit 23 SFC-program-componentization-data management unit
  23a file-data storage unit
  23b program-incorporation processing unit
  23c data input/output unit
  23d security processing unit
24 data storage unit
25 SFC-component management data
  25a component identification ID
  25b step usage number
  25c setting data
  25d comment data

The invention claimed is:

1. A motion SFC program component creation device comprising:
- a componentization unit that componentizes, in a program unit including a plurality of sequential processes, a motion SFC program including a series of a plurality of steps; and
- an incorporation unit that incorporates the componentized motion SFC programs into a motion SFC program used for a motion control executed by a driving command device that supplies a driving command to a drive device, wherein
- the incorporation unit incorporates the componentized motion SFC programs into a motion SFC program used for the motion control while maintaining each of the motion SFC programs used for the motion control and the componentized motion SFC programs in a motion-SFC program language.

2. The motion SFC program component creation device according to claim 1, wherein
the incorporation unit incorporates the componentized motion SFC program into a motion SFC program used in the motion control so as to prevent a step usage number of the motion SFC program used in the motion control from overlapping a step usage number of the componentized motion SFC program.

3. The motion SFC program component creation device according to claim 1, wherein
the componentization unit identifies at least one of an axial number, an axial device, and a user device in the componentized motion SFC programs as a replaceable part, and the incorporation unit replaces the identified replaceable part in the componentized motion SFC programs by a part according to a characteristic of the drive device.

4. The motion SFC program component creation device according to claim 1, wherein
the componentized motion SFC programs are text data described in a tag format in which a code is put between a start tag and an end tag.

5. The motion SFC program component creation device according to claim 1, wherein
a motion SFC program into which the componentized motion SFC programs are incorporated and that is used for the motion control is described in a format in which the motion SFC program can be monitored within the driving command device.

6. The motion SFC program component creation device according to claim 1, further comprising a display control unit that controls a combination of a plurality of SFC codes to be displayed on a display device so as to represent a content of the componentized motion SFC programs.

7. The motion SFC program component creation device according to claim 1, wherein the motion SFC program and the componentized motion SFC programs are in the motion-SFC program language and wherein, for each of the componentized motion SFC programs, a unique identifier and a basic structure are generated in the motion-SFC program language.

8. The motion SFC program component creation device according to claim 1, wherein the motion SFC program is a program specialized for a motion central processing unit (CPU) that serves as a driving command device and wherein the motion SFC program handles operations that a programmable logic controller (PLC) alone is unable to process.

9. The motion SFC program component creation device according to claim 1, wherein the motion SFC program is supplied to a servo motor to drive a production apparatus or a facility apparatus and wherein, for at least one of the componentized motion SFC programs, at least one replaceable part of an axial number, an axial device, and a user device is defined.

* * * * *